United States Patent Office.

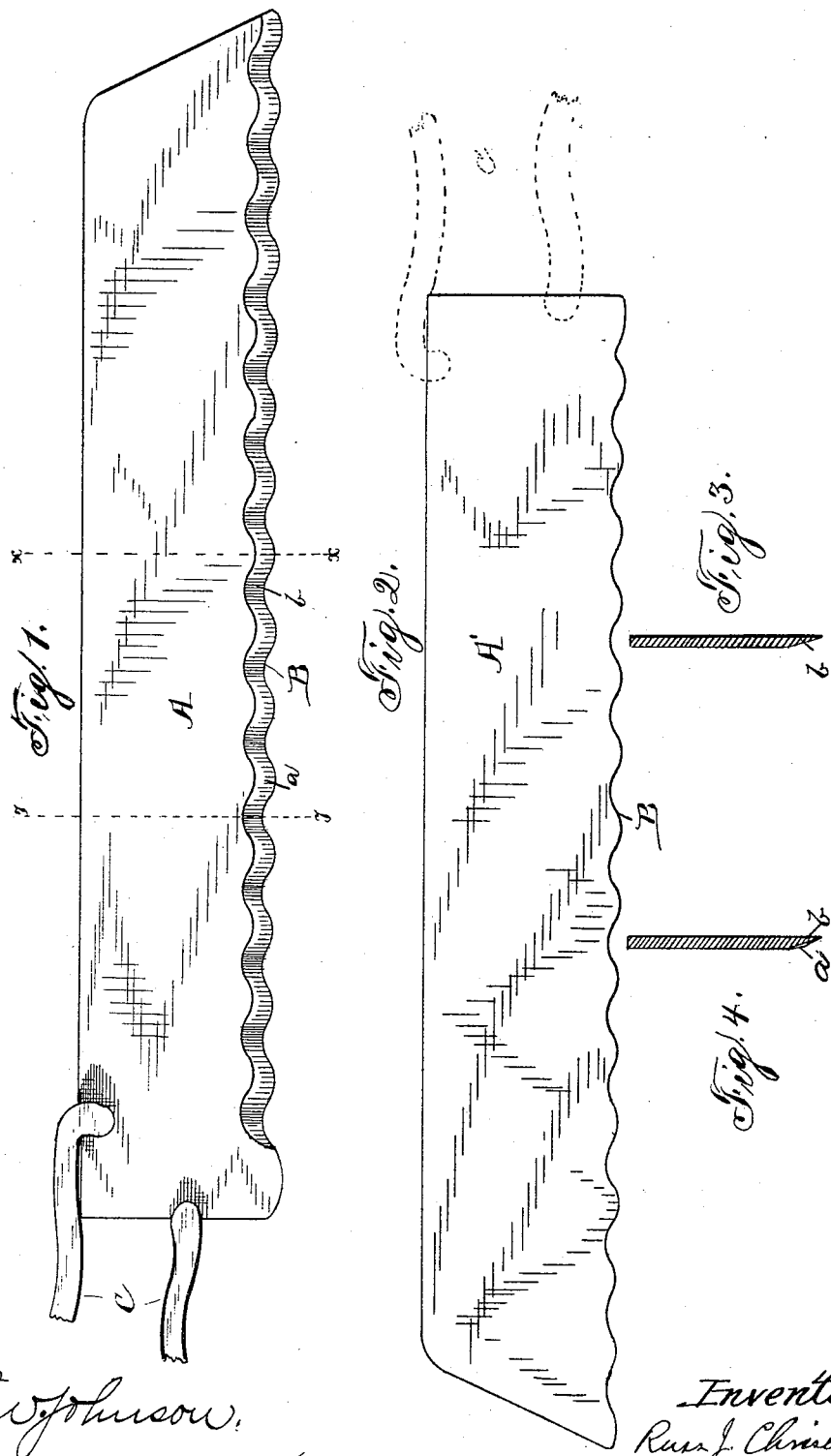

RUSS J. CHRISTY, OF SANDUSKY, OHIO, ASSIGNOR TO ROBERT H. RICE, OF FREMONT, OHIO, AND LEONIDAS H. CRESS, OF NEW YORK, N. Y.

BREAD-KNIFE.

SPECIFICATION forming part of Letters Patent No. 460,677, dated October 6, 1891.

Application filed November 4, 1890. Serial No. 370,310. (No model.)

*To all whom it may concern:*

Be it known that I, RUSS J. CHRISTY, residing at Sandusky, in the county of Erie and State of Ohio, have invented certain new and useful Improvements in Bread-Knives, of which the following is a specification, reference being had therein to the accompanying drawings.

This invention relates to knives for cutting bread, cake, and the like.

The object of the invention is to produce a knife for cutting bread or the like, which will enable the user to give the bread a neat and smooth cut and even while the bread is warm.

Figure 1 is a side elevation of the knife, showing the serrated edge and the bevel on the blade, the handle being partly broken away. Fig. 2 is a reverse side elevation of Fig. 1, showing the entire rear surface on the same plane, part or handle shown in dotted lines. Fig. 3 is a cross-section taken on the line $xx$, Fig. 1. Fig. 4 is a similar cross-section taken on the line $yy$, Fig. 1.

The letter A represents the face of a knife having a serrated or toothed edge, the teeth being preferably formed by reverse curves, so that the space between the teeth is of similar curve to the teeth. All the teeth as well as the edge between the teeth are sharpened by a bevel or incline from the front face A of the blade downward toward the rear face A', and thus form the cutting-edge.

C represents the handle partly broken away. This handle may be of any usual or approved construction.

In Fig. 1, A' represents the rear side of the knife, which is a plane surface. The plane faces A A' of the blade are substantially parallel.

These knives are so made that if the edges of two knives were put together one upon the other, one with the bevel up and the other with the same down, the "rises" of one would fit into the "falls" of the other, thus producing a smooth surface on both sides of the two blades. The bevel of the cutting-teeth is formed in the first place by the grinding all on one side, the teeth and the interdental portions of the blade being ground away by curved faced grindstones. The teeth may be sharpened afterward on the bevel side by grinding or filing with a rounded stone or file. Preferably the knife is afterward ground on the plane surface on a flat stone, which sharpens the teeth and the spaces or depressions between them at the same time.

This knife is specially serviceable for cutting bread, as it cuts as smoothly when the bread is warm as the ordinary knife does when the same is cold.

It is well known that it is very difficult to cut warm bread with the ordinary knife. This knife need only be used to appreciate its advantage over the ordinary knife.

Hay-knives, sickles, and the like have been made with teeth prior to my invention, but not with a cutting-edge like my knife.

What I claim is—

A bread-knife having teeth at one side formed on reflex curves, so that the curved spaces between the teeth are complementary to the teeth, and the teeth of one blade will fill the spaces between the teeth of another blade when the two are turned edge to edge, substantially as described.

In testimony whereof I affix my signature in presence of two witnesses.

RUSS J. CHRISTY.

Witnesses:
FRANK WENTZ,
FRANK SEITZ.